US007402019B2

(12) United States Patent
Alexander

(10) Patent No.: US 7,402,019 B2
(45) Date of Patent: Jul. 22, 2008

(54) MECHANISM FOR INSERTION OF A WHEELCHAIR INTO A CAR

(76) Inventor: Krichevsky Alexander, 11/30 Hamelch Ieoyachin Street, Ashdod 77483 (IL)

( * ) Notice: Subject to any disclaimer, the term of this patent is extended or adjusted under 35 U.S.C. 154(b) by 368 days.

(21) Appl. No.: 11/009,514

(22) Filed: Dec. 13, 2004

(65) Prior Publication Data

US 2006/0045686 A1 Mar. 2, 2006

(30) Foreign Application Priority Data

Jul. 14, 2004 (IL) .................................... 163005

(51) Int. Cl.
*B60P 3/06* (2006.01)

(52) U.S. Cl. ...................................... 414/462; 414/921

(58) Field of Classification Search ................. 414/921, 414/462

See application file for complete search history.

(56) References Cited

U.S. PATENT DOCUMENTS

| | | | | | |
|---|---|---|---|---|---|
| 4,193,505 | A | * | 3/1980 | Satterberg et al. | 212/231 |
| 4,376,611 | A | * | 3/1983 | Koop | 414/462 |
| 4,685,860 | A | * | 8/1987 | McFarland | 414/720 |
| 4,738,581 | A | * | 4/1988 | Kuhlman | 414/462 |
| 4,786,072 | A | * | 11/1988 | Girvin | 280/304.1 |
| 5,096,361 | A | * | 3/1992 | Crawford | 414/462 |
| 5,234,311 | A | * | 8/1993 | Loduha, Jr. et al. | 414/546 |
| 5,746,563 | A | * | 5/1998 | Steckler | 414/462 |
| 5,827,036 | A | * | 10/1998 | Steffes et al. | 414/462 |
| 6,582,181 | B2 | * | 6/2003 | Suehiro et al. | 414/812 |
| 6,967,736 | B2 | * | 11/2005 | Simpson et al. | 358/1.15 |

FOREIGN PATENT DOCUMENTS

| | | |
|---|---|---|
| DE | 299 19 186 U1 | 1/2000 |
| GB | 2 322 352 A | 8/1998 |
| JP | 2000 210 335 A | 8/2000 |

OTHER PUBLICATIONS

"Robot 2000", T.M.N. Devices Ltd., Driving Aids Industry, Petach-Tikva, Israel.

"Robot 2001", T.M.N. Devices Ltd., Driving Systems Manufactureres, Afez Rosh ha Ayn 48091, Israel, www.tmn.co.il.

* cited by examiner

*Primary Examiner*—Charles A Fox
(74) *Attorney, Agent, or Firm*—Nath Law Group; Jerald L. Meyer; Sung Y. Chung

(57) ABSTRACT

An apparatus mounted in the luggage compartment of a car and holding a collapsed wheelchair parallel to the rear door of the car. The apparatus comprises a base unit; a horizontal motion mechanism (HMM), and a vertical motion mechanism (VMM). The HMM includes a strong frame mounted by one end thereof to the base unit for horizontal rotation, and by the other end thereof to the VMM, a system of levers and one drive. The HMM performs about half-circle horizontal rotation of the strong frame out of the luggage compartment and, simultaneously, about quarter-circle horizontal rotation of the VMM in the opposite direction, whereby the VMM with the wheelchair is positioned outside of the car. By means of a lever mechanism and a second drive, the VMM transports the wheelchair to the front door of the car.

24 Claims, 8 Drawing Sheets

MECHANISM FOR INSERTION OF A WHEELCHAIR INTO A CAR

FIELD OF THE INVENTION

This invention relates to devices for transportation of a wheelchair in and out of a standard motor car, in particular from the luggage compartment to the front door.

BACKGROUND OF THE INVENTION

There are numerous devices for facilitating disabled drivers or passengers of a motor vehicle to transport a wheelchair with the vehicle and to take the wheelchair in and out of the vehicle. U.S. Pat. No. 5,746,563 discloses a sophisticated apparatus for transportation of a foldable wheel chair from the luggage compartment of a car to a position beside the front door of the car such that a disabled driver would be able to unfold the wheelchair and shift himself from the motor car onto the wheel chair without help of others. All mechanical parts needed for handling the wheel chair are disposed within the luggage compartment, such that the exterior appearance and the allover shape and properties of the car would not be changed. Further, the whole interior of the passenger compartment remains free for use.

This apparatus is disposed in the luggage compartment together with the collapsed wheelchair laid aside. Thus, it is suitable for use in so called "station wagon" or "estate" car where the wheelchair can be stored in horizontal position. The apparatus comprises three mechanisms and motor drives to perform the transportation:

- an L-shaped lever mounted with one end on a vertical rotary drive on the floor of the luggage compartment for rotation in horizontal plane;
- a pivotal joint on the other end of the L-shaped lever with a linear drive for pivoting the joint around a horizontal axis; and
- a telescoping lever with a telescoping drive, the telescoping lever being mounted by an end thereof to the pivotal joint at an angle with respect to the horizontal axis of the latter, and having a grip for the wheelchair at the other end.

An additional drive is used for automatic lifting and lowering the lid of the luggage compartment.

The L-shaped lever performs rotation by 270° which requires the same space along the car's axis as perpendicular to it. Also, the L-shaped lever and the pivotal joint with its linear drive must be disposed clear above the threshold of the luggage trunk. That is why such apparatus can be mounted in spacious trunks with enough vertical clearance between the threshold and the closed lid.

An apparatus based on this patent but with modified construction has been on the market. In the modification, the single telescoping lever has been replaced by a two-arm articulated lever with two linear drives. The L-shaped lever rotates in an inclined plane in order to pass over the trunk threshold but the arrangement still requires a relatively deep trunk.

SUMMARY OF THE INVENTION

In accordance with the present invention, for a motor car having a front door adjacent the driver's seat and a luggage compartment with a high rear door, there is provided an apparatus adapted to transport automatically a wheelchair from a transport position inside the luggage compartment to an extended position adjacent the front door. In the transport position, the plane of the wheelchair's wheels is essentially vertical and perpendicular to the car's longitudinal axis. The apparatus is entirely accommodated in the luggage compartment when the wheelchair is in the transport position.

The apparatus comprises a base unit firmly mountable to the floor of the luggage compartment; a horizontal motion mechanism (HMM) including a strong frame mounted by one end thereof to the base unit for horizontal rotation, and an intermediate assembly rotatably joined to the other end of the frame; a vertical motion mechanism (VMM) mounted on the intermediate assembly; and a capturing unit mounted on the VMM, for capturing and holding the wheelchair.

The apparatus is characterized in that the HMM comprises a horizontal kinematical chain including the strong frame and extending between the base unit and the intermediate assembly such that the HMM is adapted to perform, driven by a single horizontal drive only, about half-circle horizontal rotation of the strong frame from the transport position of the wheelchair in one direction and, simultaneously, about quarter-circle horizontal rotation of the intermediate assembly in the opposite direction. Thereby the VMM is positioned outside the luggage compartment, with the wheelchair adjacent to a lateral side of the car and the plane of the wheels approximately parallel to the longitudinal axis of the car.

Note: The term "high rear door" designates such door that allows passing a wheelchair in substantially vertical position therethrough. The terms "parallel" or "perpendicular" when related to the wheelchair refer to the plane of the chair's large wheels.

The VMM is adapted to transport the wheelchair along the lateral side of the car, from the position outside the luggage compartment to the extended position, and back, by means of a single vertical drive.

The VMM may be positioned outside the luggage compartment such that the plane of the wheels of the wheelchair is converging with the longitudinal axis of the car towards the front door, in order to bring the wheelchair closer to the front door in the extended position.

In accordance with a preferred embodiment of the apparatus, the horizontal kinematical chain further comprises a plurality of members connected to the strong frame, to the base unit, to the intermediate assembly and between themselves so as to form a horizontal articulated planar mechanism with one degree of freedom.

The strong frame preferably has the shape of horizontally disposed letter C with an open side facing the high rear door when the wheelchair is in the transport position.

Preferably, the horizontal kinematical chain comprises a first four-member articulated mechanism including as members the base unit, the strong frame, a third member and a fourth member from said plurality of members, lengths of the four members being selected such that rotation of the third member by a predetermined angle relative to the strong frame results in rotation of the strong frame by twice the predetermined angle relative to the base unit, in the opposite direction.

The horizontal kinematical chain may further include a second, a third and a fourth four-member articulate mechanisms based on three sides of the C-shaped strong frame, the second one including the third member from the first four-member articulated mechanism and the fourth one including the intermediate assembly such that rotation of the third member by a predetermined angle relative to the strong frame results in rotation of the intermediate assembly by approximately the same predetermined angle relative to the strong frame.

Lengths of the members in the second, third and fourth four-member articulate mechanisms may be selected so that rotation of the third member by a predetermined angle relative to the strong frame would result in rotation of the intermediate assembly by a lesser angle relative to the strong frame, such that after rotation of the strong frame by half-circle, the plane of the wheelchair's wheels is positioned converging with the longitudinal axis of the car towards the front door.

Preferably, the second and the third four-member articulate mechanisms are parallelograms.

The horizontal drive may be a linear acting gear or a hydraulic cylinder pivotally joined to the strong frame and, via some of the plurality of members, to the base unit.

The VMM comprises a first four-member articulate mechanism including as members a base bracket firmly fixed to the intermediate assembly, a first arm pivotally joined to the base bracket by a first end thereof, a second arm pivotally joined by an axis N to a second end of the first arm and a first rod joined to an upper end of the second arm and to the base bracket. The second arm has a lower end with a capturing unit bracket joined thereto for carrying the capturing unit. The vertical drive is adapted to rotate the first arm relative to the base bracket, such that rotation of the first arm in one direction provides for simultaneous rotation of the second arm in the other direction, whereby the capturing unit can be simultaneously moved away from the base bracket and lowered towards the earth.

Preferably, the first rod has a freely sliding joint at an end thereof, such that when the capturing unit is lowered by the VMM and the wheels of the wheelchair or wheels of the capturing unit rest on the earth beside the motor car, the sliding joint allows further rotation of the first and the second arms and horizontal movement of the capturing unit away from the base bracket.

Preferably, the VMM further comprises a triangular lever pivotally joined to the axis N, a second rod joined to the triangular lever and to the base bracket parallel to said first arm to form a first parallelogram; and a third rod joined to the triangular lever and to the capturing unit bracket parallel to the second arm to form a second parallelogram such that while the two arms rotate, said capturing unit bracket is translated without rotation.

The vertical drive may be a linear-acting gear or a hydraulic cylinder joined to the base bracket and to the first arm.

The capturing unit for holding the wheelchair comprises two fork-shaped fixing members adapted to receive two pins mounted on the wheelchair frame, by horizontal rolling of the wheelchair towards the fork-shaped members. The two fork-shaped members may be formed as notched sides of a horizontal C-shaped bracket mounted to the capturing unit bracket. Preferably, the capturing unit includes a third fixing member adapted to hold a third point of the wheelchair simultaneously blocking the motion of the wheelchair relative to the fork-shaped members. Thus the wheelchair is reliably secured to the capturing unit during the transportation.

The third fixing member may comprise an arcuate beam with one end rigidly mounted to the C-shaped bracket and a second end adjacent the front of the wheelchair, and a lock on the second end adapted to lock on the wheelchair. Preferably, the lock is a vertical pin adapted to enter an eye associated with the frame of the wheelchair such that the wheelchair may be locked on the pin by slight lifting and lowering the front of the wheelchair. Preferably, the pin is pivotal about a horizontal axis such that the pin can be flipped out of the way of the wheelchair rolling to or off the fork-shaped members.

Preferably, the apparatus includes a device for automatic opening and closing of the rear door of the car before and after the transportation, mounted on the base unit.

The apparatus of the present invention may be used in cars with high rear door, vertical or slightly inclined, such as estate cars, station wagons, minivans, MPV, SUV, off-roads or 4WD. Since the apparatus occupies very little space along the motor car axis, it can be installed behind the rear seats in relatively small cars like urban hatchbacks, compacts and mini-compacts, to be used with a collapsible wheelchair. If the luggage compartment is larger, then a non-foldable chair may be transported, or the remaining space may be used for its original purpose.

The apparatus has simpler structure than the known devices, its manufacture and maintenance are cheaper and installation costs are lower, while the reliability and the operational life are increased.

The kinematics of the apparatus provides for simultaneous movement (pivoting) of two members in each of the mechanisms by the action of a single drive. Thus, two drives are sufficient for the transportation of the wheelchair.

The usage of only two drives for the complex motion of the apparatus allows employing of a relatively simple electric circuit for automatic control which must only switch on and off the drives in turn.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
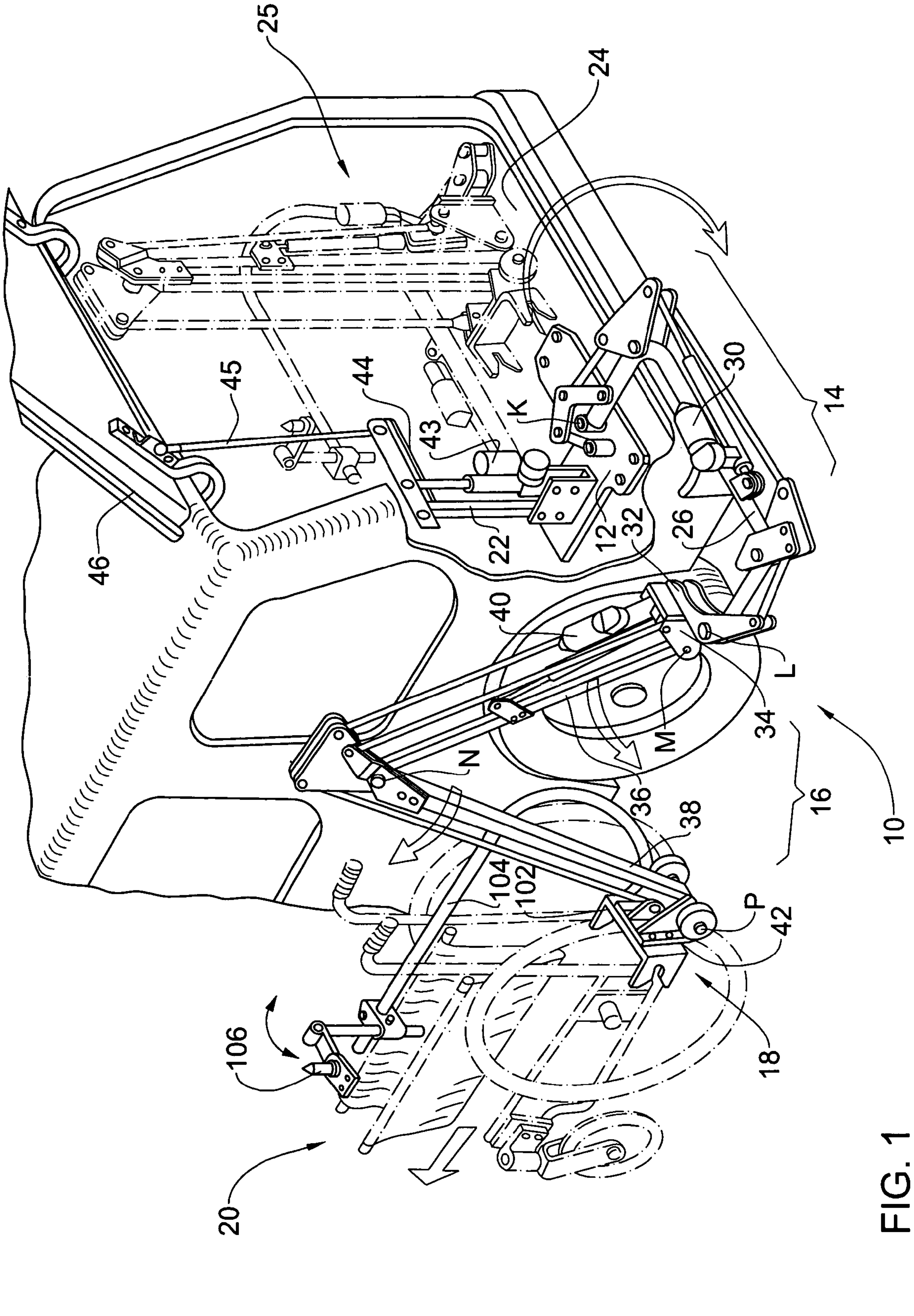
FIG. 1 is a perspective view of the apparatus of the present invention from the rear of a motor car.

With reference to FIG. 1, the apparatus 10 according to the present invention comprises a base unit 12, a horizontal motion mechanism 14, a vertical motion mechanism 16, a capturing unit 18 for capturing and holding the wheelchair 20, and door-opening unit 22. The base unit 12 is firmly mounted to the floor 24 of the luggage compartment 25.

The horizontal motion mechanism 14 comprises a strong C-shaped frame 26 mounted by one end to the base unit 12 for rotation in horizontal plane around axis K, a horizontal drive unit 30, an intermediate assembly 32 mounted to the other end of the frame 26 for rotation in horizontal plane around axis L, and a plurality of links (levers and rods) pivotal in horizontal plane whose working will be explained further.

The vertical motion mechanism 16 comprises a base bracket 34 firmly fixed to the intermediate assembly 32, a first arm 36 pivotally joined by one end to the base bracket 34, with horizontal axis M, a second arm 38 pivotally joined by an axis N to the second end of the first arm 36, a vertical drive unit 40, a capturing unit bracket 42 pivotally joined by an axis P to a lower end of the second arm 38, and a plurality of links (levers and rods) pivotal in vertical plane whose working will be explained further. The capturing unit 18 is firmly fixed to the capturing unit bracket 42.

The door-opening unit 22 is mounted on the base unit 12 and comprises a drive unit 43, a lever 44 and a rod 45 connected to the rear door 46.

The apparatus 10 is shown in FIG. 1 in almost extended position where the door-opening unit 22 has opened the rear door 46, the horizontal motion mechanism 14 is outside the luggage compartment 25, the vertical motion mechanism 16 is parallel to the side of the car and is in process of unfolding. The capturing unit 18 moves forward and the wheelchair 20 approaches the front door (not shown).

The apparatus 10 is also shown, by broken lines in FIG. 1, in transport (folded) position, without the wheelchair. In this position, the horizontal motion mechanism 14 is in the luggage compartment, the C-shaped frame is orientated with its open side to the door, and the vertical motion mechanism 16 is folded in a neat vertical stack so that the door opening unit 22 can lower and close the rear door 46.

Figure 2A:
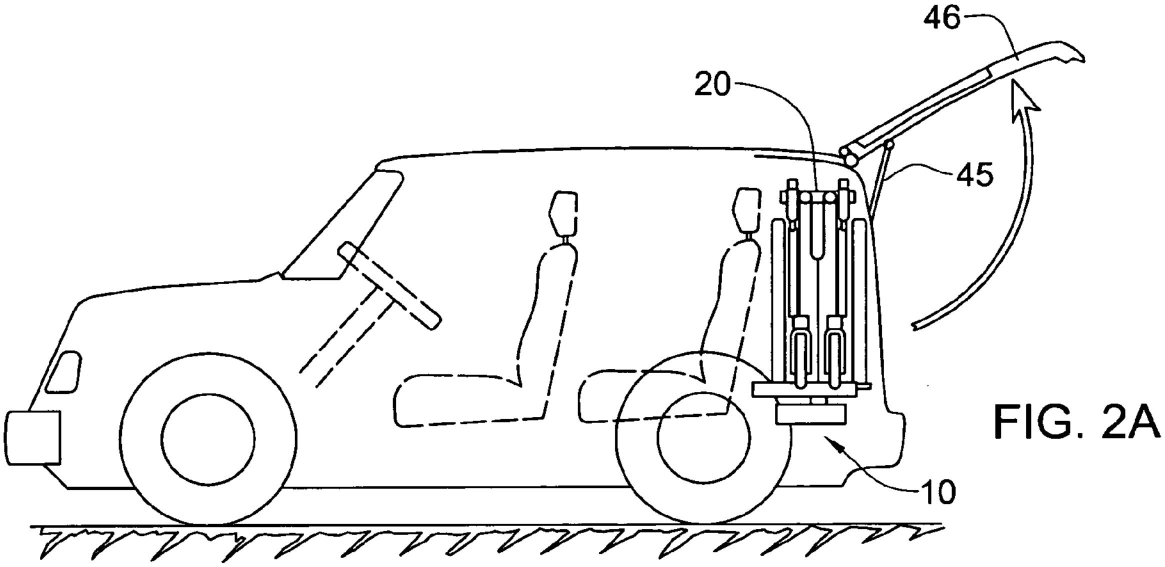
FIGS. 2A to 2G illustrate stages of transportation of a wheelchair from the luggage compartment to the front door by means of the apparatus of the present invention.
Figure 2B:
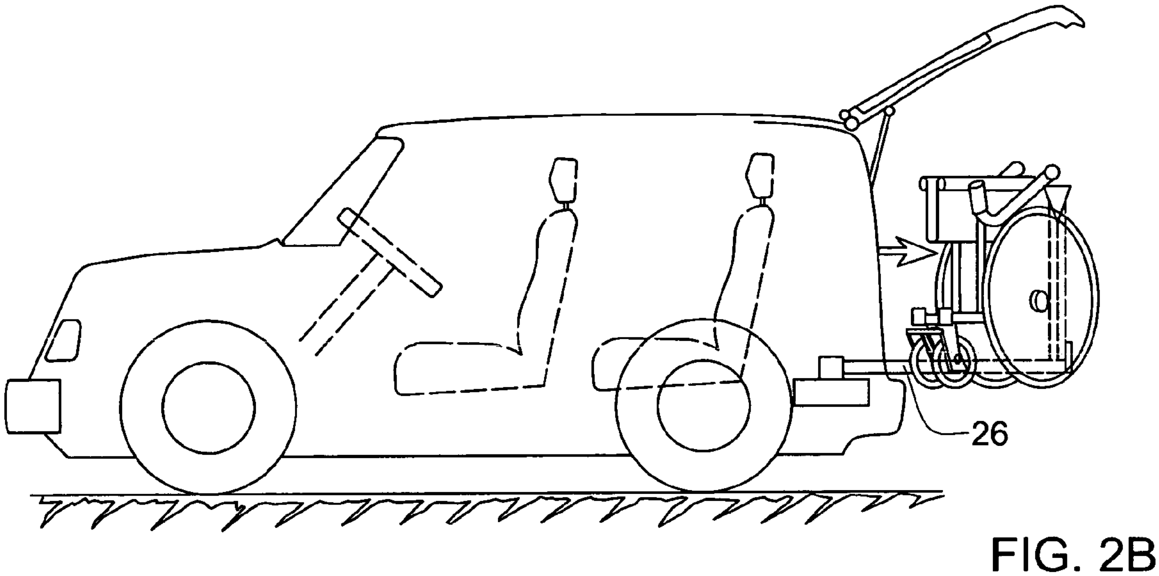
Figure 2C:
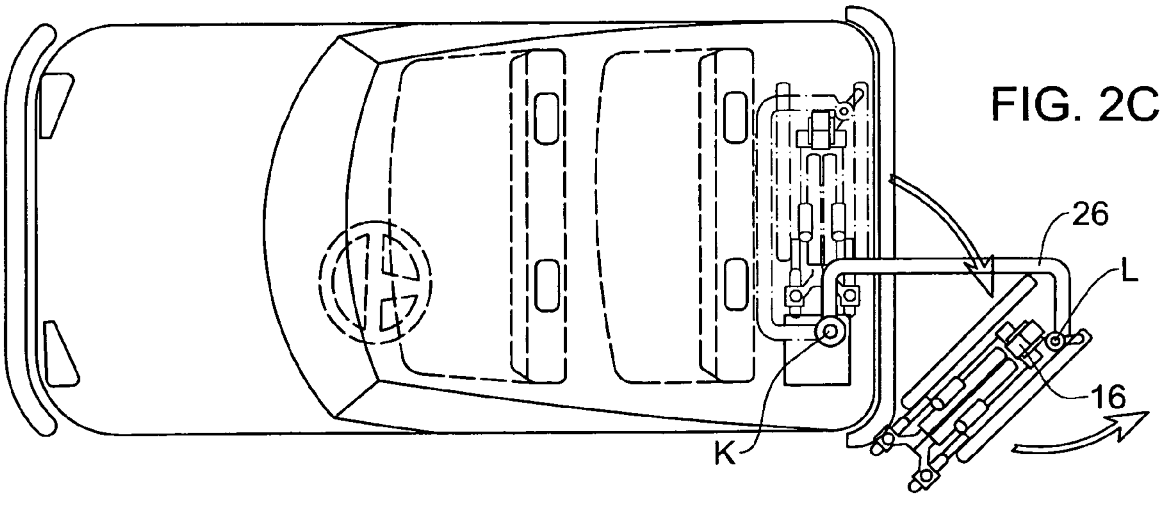

The working of the apparatus will be better understood with the help of FIGS. 2A to 2G showing successive positions during the wheelchair transportation. In FIG. 2A, the folded wheelchair 20 and the apparatus 10 are inside the luggage compartment while the door opening unit 22 raises the rear door 46 by pushing the lever 44 and the rod 45. Then the horizontal drive unit 30 starts working and turns the C-shaped frame 26 clockwise (in plan view). Simultaneously, by workings of the lever system in the horizontal mechanism, the intermediate assembly 32 carrying the vertical mechanism 16 together with the wheelchair 20 turns anticlockwise but to a lesser angle. FIGS. 2B and 2C show a position where the C-shaped frame 26 has made a 90° turn while the vertical motion mechanism 16 is turned by 45°.

Figure 2D:
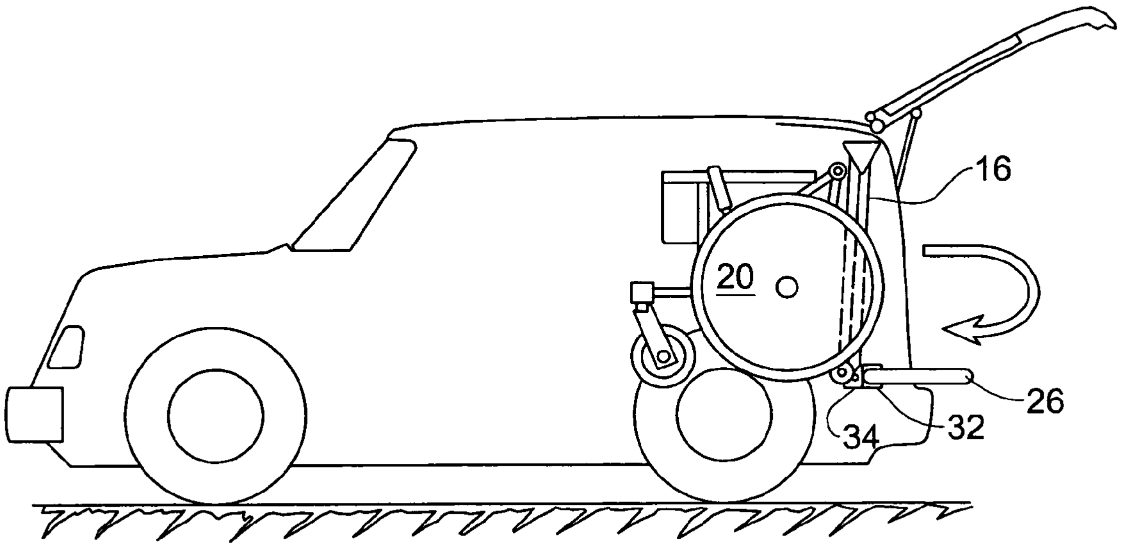
Figure 2E:
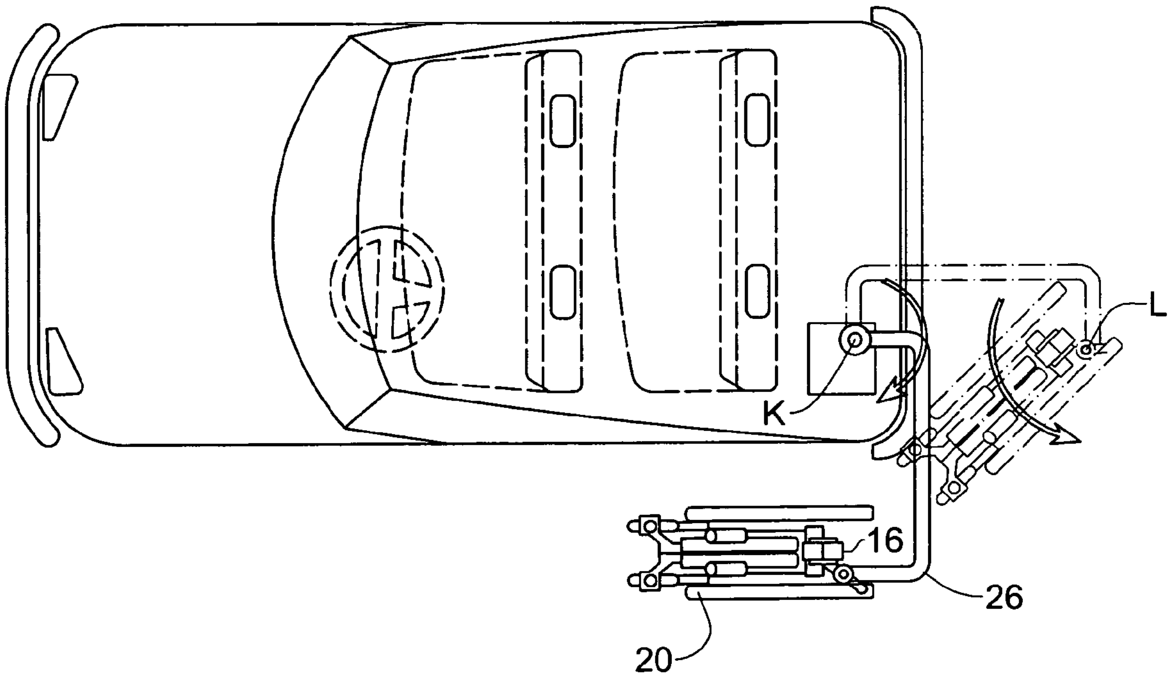

By further action of the horizontal drive unit 30, the C-shaped frame completes a 180° turn, while the intermediate assembly 32 completes a 90° turn, and the apparatus arrives to an intermediate position shown in FIGS. 2D and 2E. Now the vertical mechanism 16 with the wheelchair 20 is outside of the car and substantially parallel to its side. The horizontal drive 30 stops working.

Figure 2F:
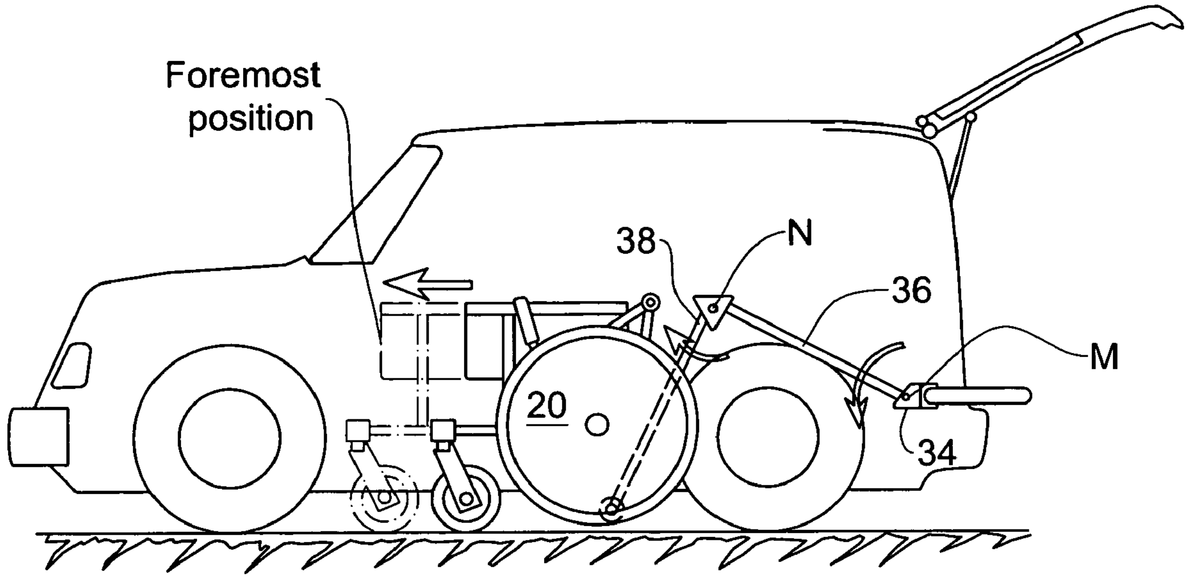
Figure 2G:
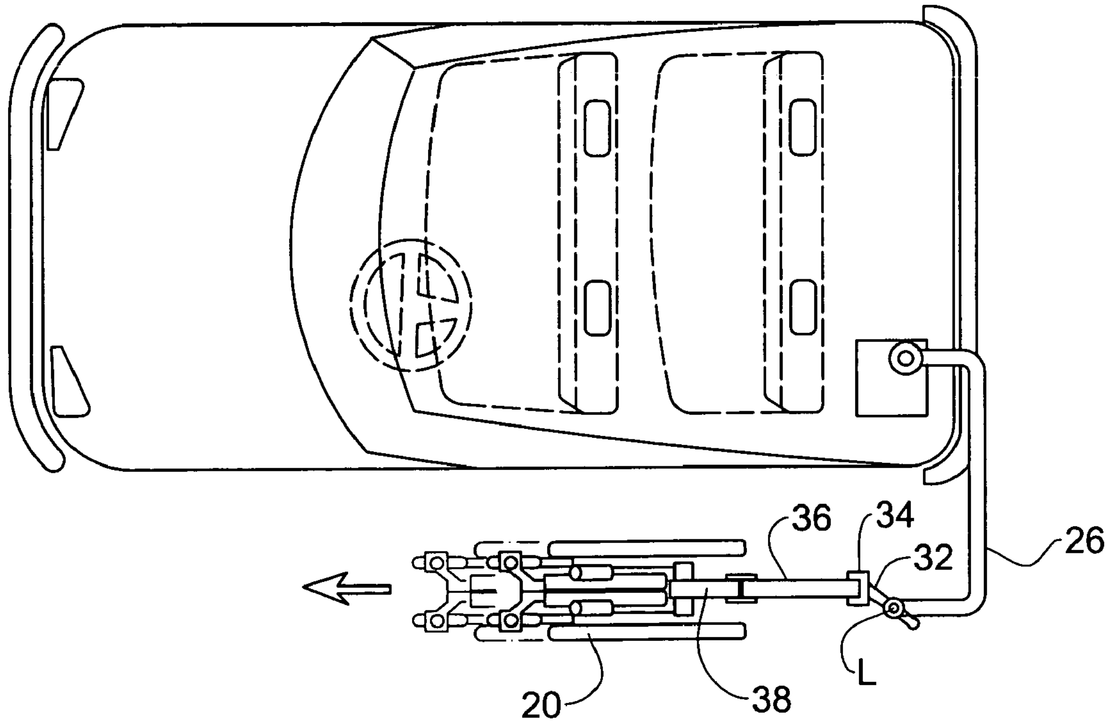

Now the vertical drive unit 40 starts working. With reference to FIG. 2F, the first arm 36 turns anticlockwise around the axis M in the base bracket 34, while the second arm 38 turns clockwise around the axis N in the first arm 36. Thereby, the wheelchair 20 is translated forward and downward until its wheels or the wheels of the capturing unit 18 touch the earth, as shown in FIGS. 2F and 2G. Further action of the vertical drive unit 40 rolls the wheelchair 20 on the earth towards its extended (foremost) position shown in broken lines.

From this position, a disabled driver can easily release the wheelchair from the capture unit (explained in detail further) and unfold it. The retraction of the apparatus, with or without the wheelchair, back into the luggage compartment is carried out in the reverse order.

Figure 3:
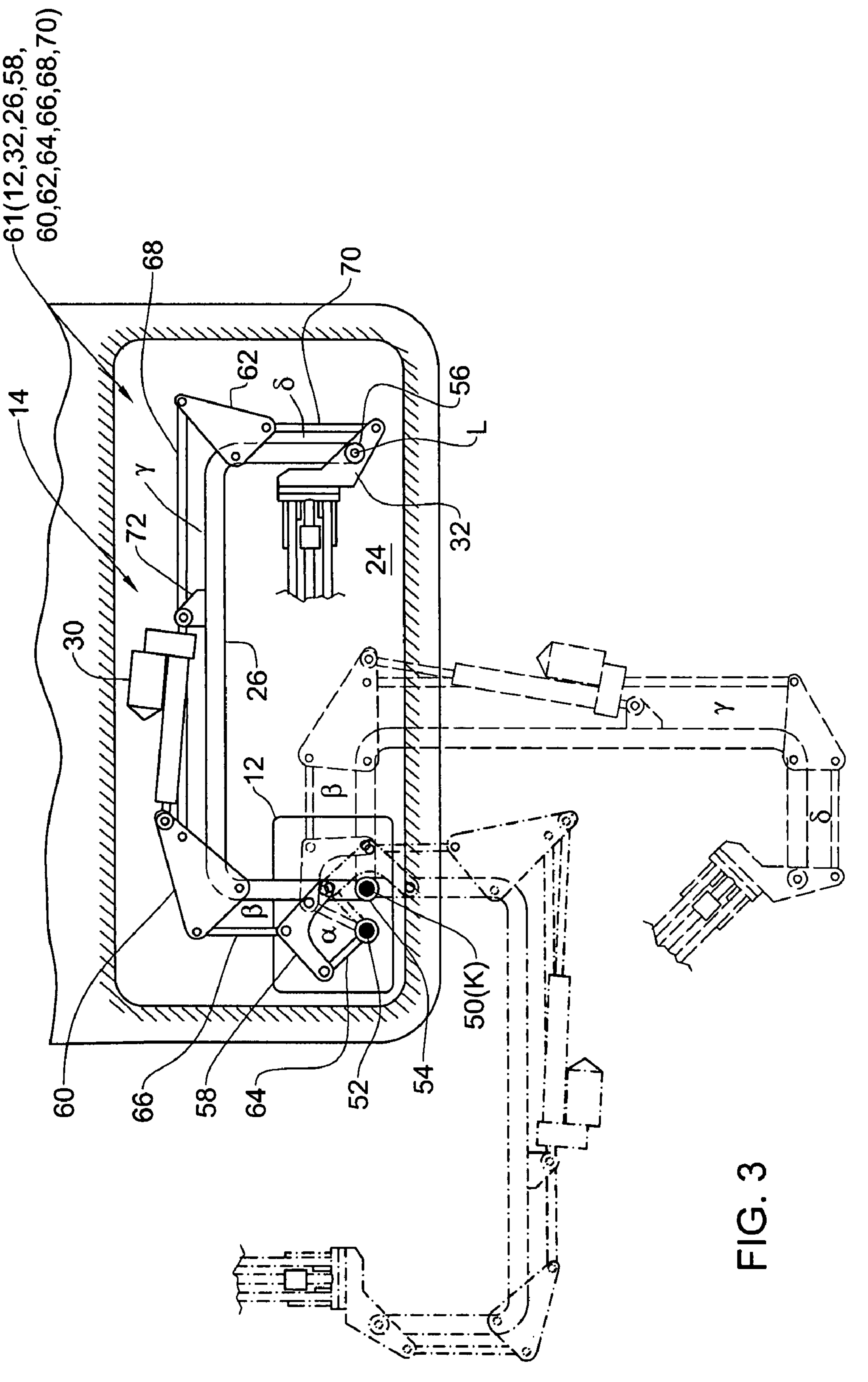
FIG. 3 shows a plane view of the horizontal motion mechanism in the apparatus of the present invention.

With reference to FIG. 3, the structure and function of the horizontal motion mechanism 14 will be explained in detail. The base unit 12 carries two vertical axles 50 and 52. The C-shaped frame 26 has bushings 54 and 56 at either end and is mounted for rotation on the axle 50 (axis K), by means of the bushing 54. The intermediate assembly 32 is mounted for rotation at the other end of the frame 26, in the bushing 56. The plurality of links pivotal in horizontal plane includes triangle levers 58, 60 and 62, and rods 64, 66, 68 and 70. They are arranged in four articulated four-member mechanisms based on the three sides of the C-shaped frame:

α (including members 64, 58, 26 and the base unit 12),

β (including members 26, 58, 66, 60),

γ (including members 26, 60, 68, 62), and

δ (including members 26, 62, 70 and the intermediate assembly 32).

Owing to the fact that the frame 26 is included in all four mechanisms and levers 58, 60 and 62 are included in two mechanisms each, the horizontal motion mechanism constitutes a single planar articulate mechanism (or a kinematical chain 61) having one degree of freedom with respect to the base unit 12.

The four-member mechanism α, which includes the base unit 12, the strong frame 26, a third member (the triangular lever 58), and a fourth member (the rod 64), is characterized in that its members are of unequal lengths which are selected so that if the member 64 is rotated by 90° clockwise relative to the base unit 12, the triangle 58 rotates also about 90° but the frame 26 rotates about twice that angle.

Mechanisms β, γ and δ are parallelograms.

The horizontal motion mechanism 14 further includes the driving unit 30 which is a linearly acting gear joined pivotally with one end to a bracket 72 welded on the frame 26, and with the other end to the triangle 60. The linearly acting gear is known per se in the art. In an exemplary embodiment, it includes an electric motor driving a worm-gear reducer, which, via two bevel gears, rotates a spindle screw. The spindle screw rotates in a nut which is press-fitted in a tubular plunger sliding in a cylinder fixed to the motor and worm-gear housing. The linearly acting gear commonly includes a normally closed brake and limit switches.

The successive positions of the horizontal motion mechanism 14 are shown in the same FIG. 3 in dash lines and in dash-dot lines, respectively.

In the transport (retracted) position of the horizontal motion mechanism 14, the C-shaped frame 26 is entirely within the luggage compartment, with its middle side parallel to the rear door. The intermediate assembly 32 is in such a position that the wheelchair is also parallel to the rear door. The horizontal drive unit 30 is in its most contracted state between the bracket 72 and the triangle 60.

Upon actuation of the drive unit 30, it starts to extend and to rotate the triangle 60 with respect to the frame 26. The parallelogram β and the four-member mechanism α start to move. While the triangle 58 is rotated anticlockwise relative to the frame 26, the frame 26 rotates clockwise about the axle 50 (point K) carrying the whole horizontal mechanism out of the luggage compartment. As explained above, the frame 26 rotates by approximately twice the angle of rotation of members 58 and 64 relative to the base unit 12, i.e. while the frame describes a 180° arc to its final position outside the car, the triangle 58 rotates by 90° relative to the base unit (or 90° in the opposite direction relative to the frame).

Simultaneously, the rod 68 of the parallelogram γ pulls the linked triangle lever 62 of the parallelogram δ, turning the intermediate assembly 32 anticlockwise about the bushing 56 (axis L). The intermediate assembly 32 turns by the same angle relative to the frame 26 as the levers 62, 60 and 58, i.e. by 90° anticlockwise. Thus the wheelchair is positioned with the plane of its wheels parallel to the car's axis.

Alternatively, it may be advantageous to position the wheelchair in a plane not parallel to but slightly converging with the car's axis towards the driver's door, for easier access from the driver's seat. For this purpose, one or more of the four-member mechanisms β, γ and δ may made slightly deviating from the parallelogram shape. Also, the four-member mechanism α may be slightly modified for the same purpose.

With reference to FIGS. 4A to 4C and 5, the structure and function of the vertical motion mechanism 16 will be explained in detail. The base bracket 34, which is firmly fixed to the intermediate assembly 32, has three horizontal axles 78 (axis M), 80 and 82. The first arm 36 is pivotally joined by one end to the axle 78, while its second end is pivotally joined by an intermediate axle 84 (axis N) to a bracket 90 which is an integral part of the second arm 38. A rod 96 is connected to the bracket 90 by an axle 97 and to the base bracket 34 by the axle 80. Thus a four-member planar mechanism λ is formed including members 36, 34, 96 and 90(38). The bracket 90 has an oval eye 94 accommodating one end of the rod 96 with the axle 97. The oval eye 94 allows sliding of the axle 97 therein for a purpose explained below.

The vertical motion mechanism 16 includes the driving unit 40 which is a linearly acting gear, similar to the above-described driving unit 30, joined pivotally with one end to a bracket 98 on the first arm 36, and with the other end to the axle 82 on the base bracket 34.

The vertical motion mechanism further includes the capturing unit bracket 42 and a few more links as follows. A triangular lever 86 is joined to the axle 84 (N) and is pivotally connected by a rod 88 to the axle 80 on the base bracket 34, so that members 34, 36, 86 and 88 form an articulated parallelogram ϵ. The capturing unit bracket 42 is pivotally joined to a lower end of the second arm 38, by an axle P. A rod 91 is pivotally joined to the capturing unit bracket 42 and to the triangle 86, so that members 38, 42, 91 and 86 form an articulated parallelogram μ. The capturing unit bracket 42 comprises a mounting plate 93 for assembly of the capturing unit 18, and a pair of wheels 92.

In the transport (retracted) position of the vertical motion mechanism 16 (FIG. 4A), the arms 36 and 38 are essentially vertical and adjacent to each other. The mounting plate 93 of the capturing unit bracket 42 is also vertical. The vertical drive unit 40 is in its most contracted position between the bracket 98 and the base bracket 34. This position is maintained in the luggage compartment 25 and the whole way while the horizontal motion mechanism 14 turns in or out of the luggage compartment.

When the horizontal motion mechanism 14 is in its outermost position (FIG. 2E or FIG. 3, dash-dotted lines) and the horizontal drive unit 30 is stopped, the vertical drive unit 40 is actuated. The drive unit 40 starts to extend and to rotate the first arm 36 downward (anticlockwise) from the initial position in FIG. 4A. Simultaneously, the rod 96 pulls the second arm 38 and rotates it in the other direction, while the parallelograms ϵ and μ maintain the mounting plate 93 in vertical orientation. Thus, the vertical motion mechanism 16 arrives to the unfolded position of FIG. 4B where the wheels 92 and/or wheels of the wheelchair rest on the earth.

Figure 4B:
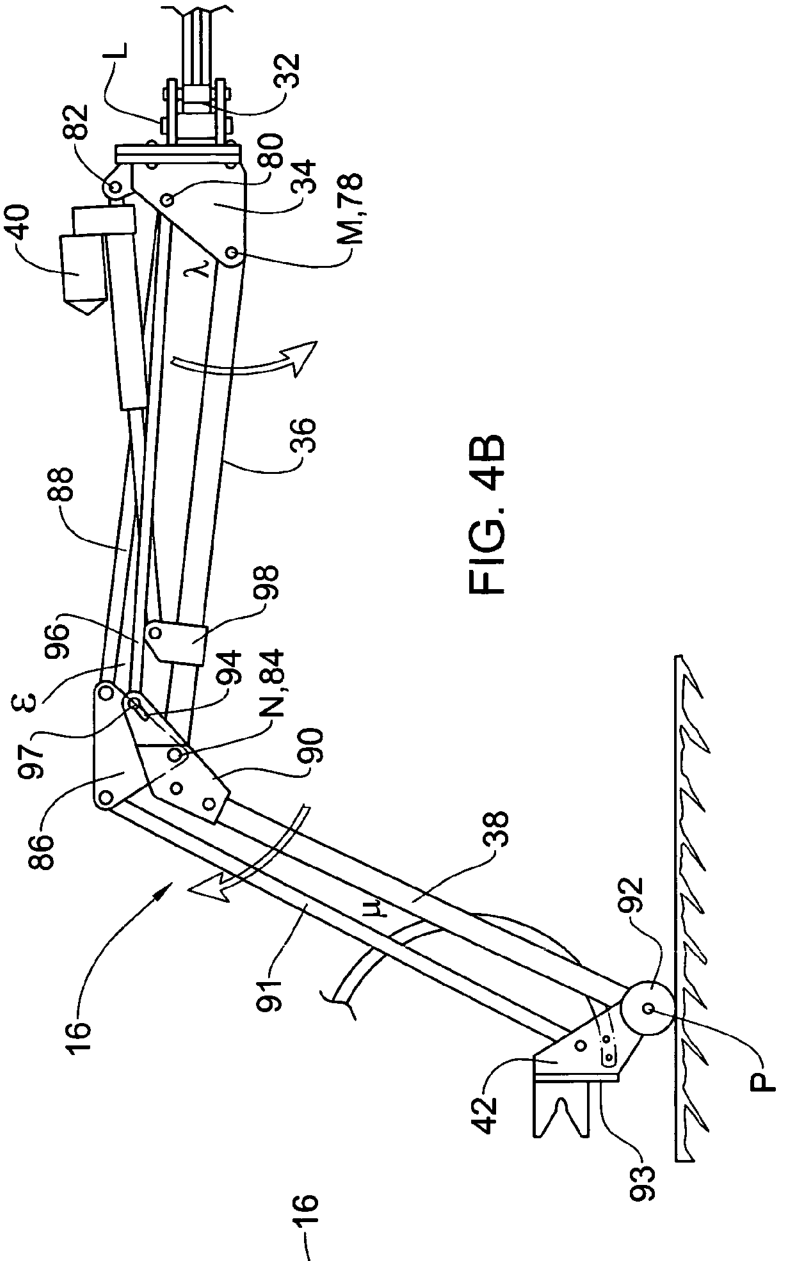
FIGS. 4A to 4C are side views of three successive positions of the vertical motion mechanism in the apparatus of the present invention.
Figure 4A:
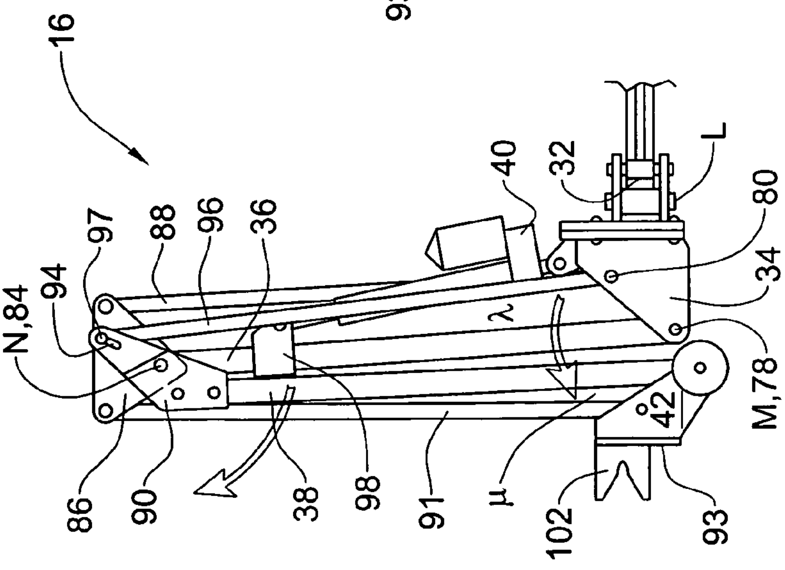
Figure 4C:
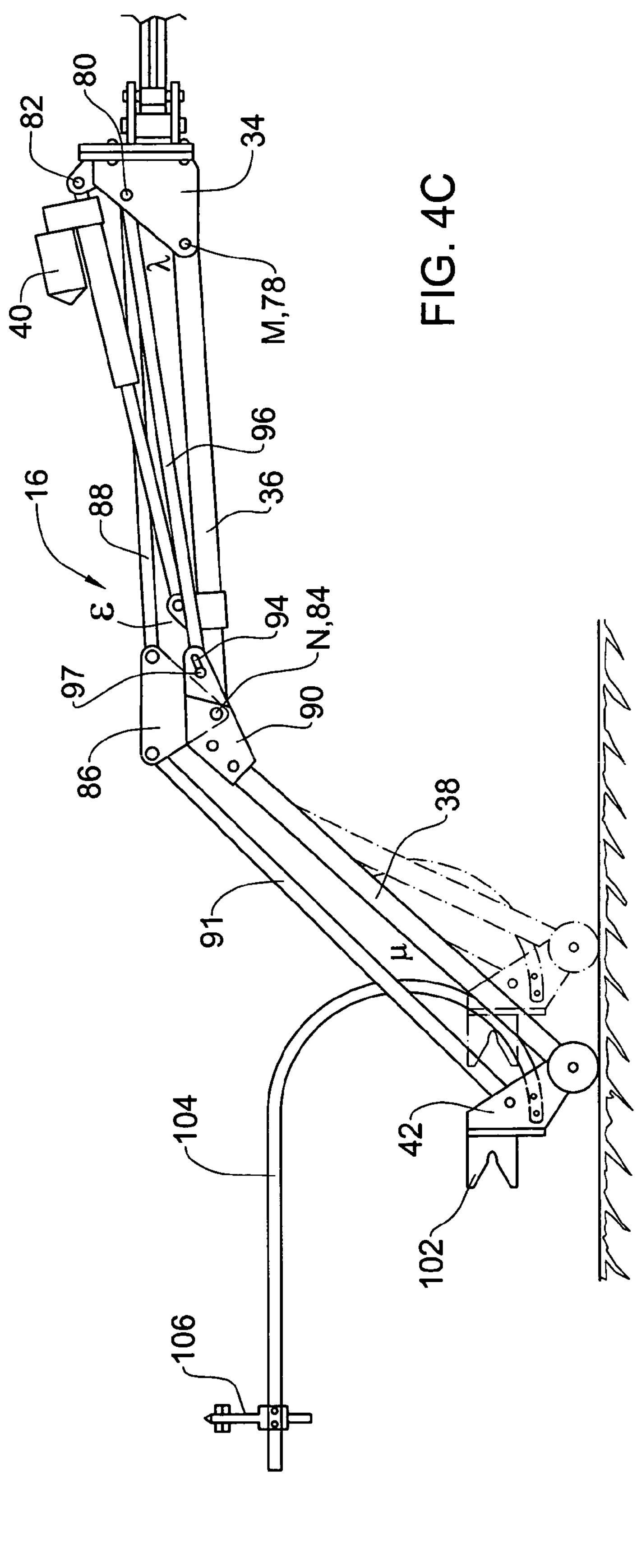
Figure 5:
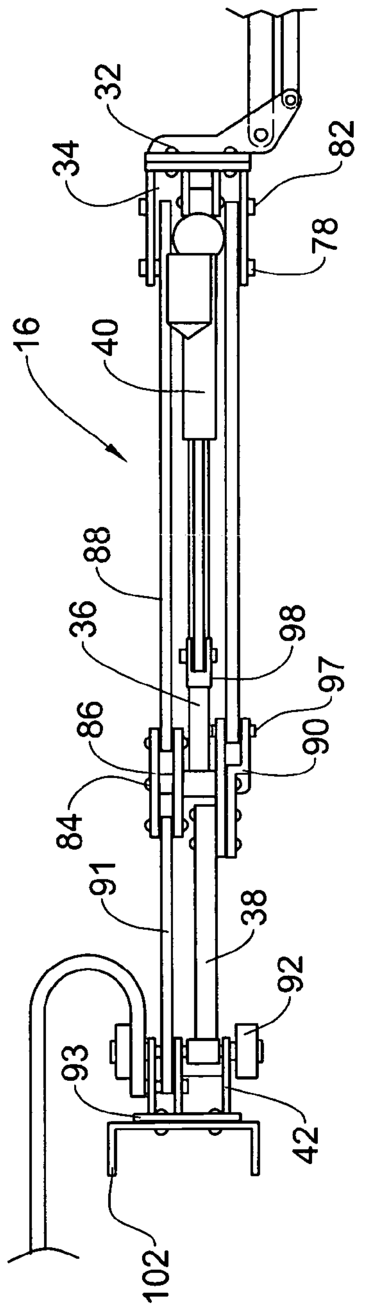
FIG. 5 is a plan view of the vertical motion mechanism in the position of FIG. 4B.

From this position, the working of the vertical drive unit 40 may yet continue for a while, towards the most extended position shown in FIG. 4C. It will be appreciated that, after the wheels 92 abut the earth, a perfectly closed kinematical chain 61 should stop to move. However, the oval eye 94 allows the axle 97 to slide therein together with the end of the rod 96 until the axle 97 abuts the other end of the oval eye. The ability to continue the forward motion after "landing" provides the apparatus with inherent adjustability to uneven terrain and to variations of the distance to the front door in different motor cars—without any mechanical adjustments.

Figure 6A:
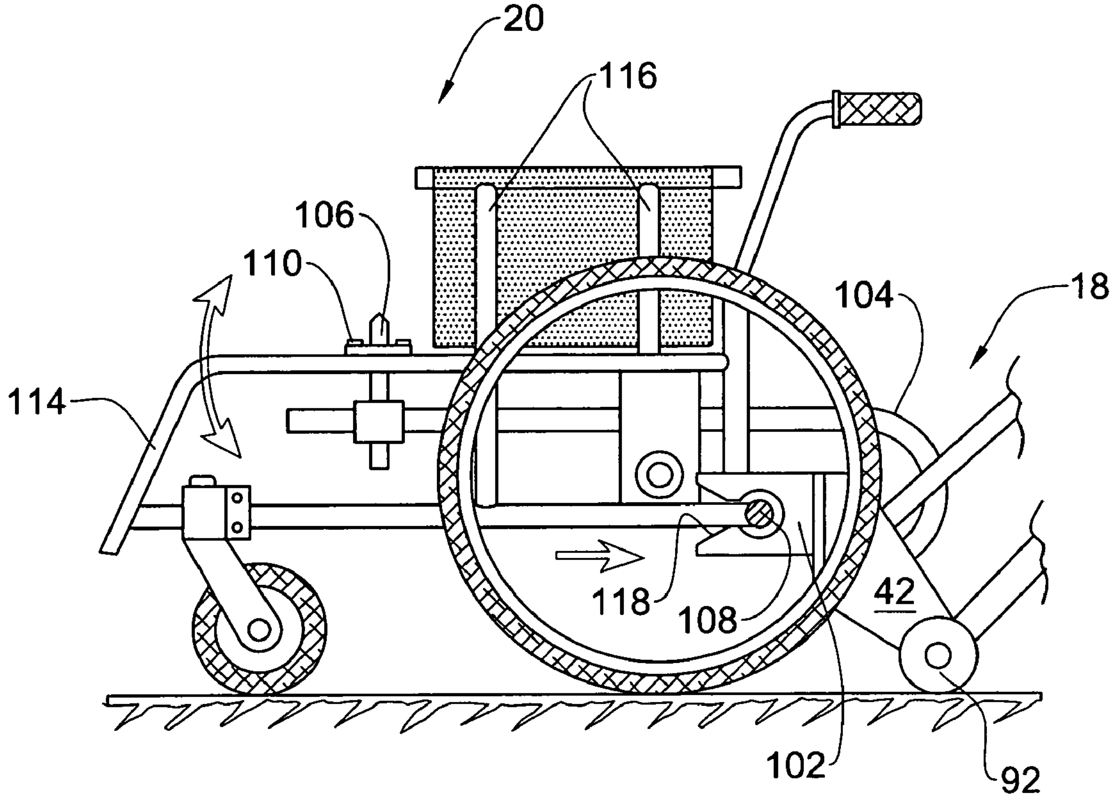
FIGS. 6A and 6B are a side view and a plan view of the capturing unit with the wheelchair.
Figure 6B:
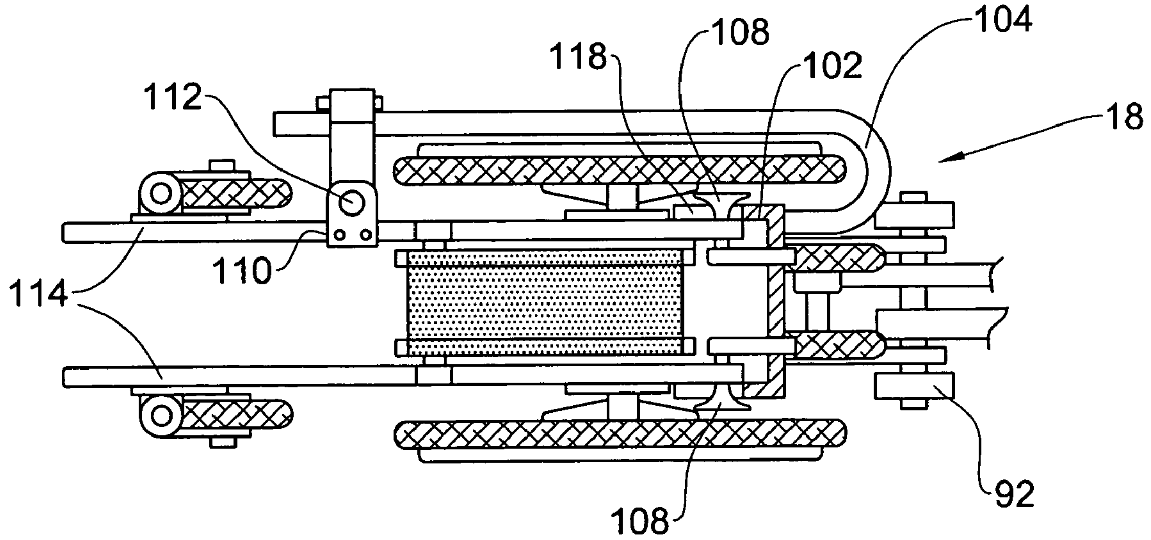

With reference to FIGS. 6A and 6B, the capturing unit 18 comprises a C-shaped bracket 102 and an arcuate beam 104 with adjustable and pivotal pin 106. The system for capturing and holding the wheelchair 20 also includes two pins 108 with flaring conical heads and a bracket 110 with an eye 112. A collapsible wheelchair usually comprises two strong vertical frames 114 that carry the wheels, handles and seat supports. The frames are connected by collapsible scissor levers 116.

The two pins 108 are fixed to the lower hind side of each frame 114 with axes in horizontal transverse direction. The bracket 110 is fixed to the front upper member of one of the frames 114. The bracket 102 has two notches 118 with flared entrance adapted to receive the two pins 108. The bracket 102 is mounted to the capture unit base 42 at suitable height above the wheels 92, such that when the wheels 92 are on the earth, the pins 108 can be inserted in the notches 118 by rolling the wheelchair backwards. The arcuate beam 104 is mounted firmly to the bracket 102 or to the capture unit base 42 and is shaped so as to position the adjustable pivotal pin 106 in the eye 112 when the pins 108 are captured in the notches 118. In order to insert the pin 106 in the eye 112 or to release it, the user has only to lift a bit the front end of the wheelchair from the earth, while the large wheels rest on the earth. The pin 106 is made pivotal about a horizontal axis so that it can be flipped out of the way of the adjacent wheel. Thus, the wheelchair can be reliably fixed in three points with respect to the capturing unit 18 and to the whole apparatus 10.

The rear door of the standard motor car has unlocking and releasing mechanism which is controlled from the driver's seat. The respective control can be easily connected or synchronized with the drive 43 of the door-opening unit 22. The fact that the horizontal motion mechanism rotates only by half-circle allows the door-opening unit 22 to be mounted on the base unit 12. This reduces the work for the installation of the apparatus in the car.

Although a description of specific embodiment has been presented, it is contemplated that various changes could be made without deviating from the scope of the present invention. For example, drives of other types can be used with the present invention, i.e. hydraulic cylinders. The kinematical chain in the HMM or the VMM may use not only articulated mechanisms but also chain-sprocket and/or toothed gear mechanisms, telescope levers, etc. It will be appreciated that non-collapsible chairs can be easily handled if the strong C-shaped frame is made with longer lateral arms.

The invention claimed is:

1. For a motor car having a front door adjacent the driver's seat and a luggage compartment with a high rear door, an apparatus adapted to transport automatically a wheelchair from a transport position inside said luggage compartment to an extended position adjacent said front door, said apparatus being entirely accommodated in said luggage compartment when said wheelchair is in said transport position, said apparatus comprising a base unit firmly mountable to the floor of said luggage compartment;

a horizontal motion mechanism (HMM) including a strong frame mounted by one end thereof to said base unit for horizontal rotation, and an intermediate assembly rotatably joined to the other end of said frame;

a vertical motion mechanism (VMM) mounted on said intermediate assembly; and a capturing unit mounted on said VMM, for capturing and holding said wheelchair, wherein in said transport position, the plane of the wheelchair's wheels is essentially vertical and perpendicular to the car's longitudinal axis;

said HMM further comprises a horizontal drive and a horizontal kinematical chain including said strong frame and extending between said base unit and said intermediate assembly such that said HMM is adapted to perform, driven by said horizontal drive only, about half-circle horizontal rotation of said strong frame from said transport position of the wheelchair in one direction and, simultaneously, about quarter-circle horizontal rotation of said intermediate assembly in the opposite direction, thereby positioning said VMM outside the luggage compartment, with said wheelchair adjacent to a lateral side of said car and said plane of the wheels approximately parallel to said longitudinal axis of the car.

2. The apparatus according to claim 1, wherein said plane of the wheels, when said wheelchair is positioned adjacent to said lateral side of the car, is converging with said longitudinal axis of the car towards said front door.

3. The apparatus according to claim 1, wherein said horizontal kinematical chain further comprises a plurality of members connected to said strong frame, to said base unit, to said intermediate assembly and between themselves so as to form a horizontal articulated planar mechanism with one degree of freedom.

4. The apparatus according to claim 3, wherein said horizontal kinematical chain comprises a first four-member articulated mechanism including as members said base unit, said strong frame, a third member and a fourth member from said plurality of members, lengths of the four members being selected such that rotation of said third member by a predetermined angle relative to said strong frame results in rotation of said strong frame by twice said predetermined angle relative to said base unit, in the opposite direction.

5. The apparatus according to claim 4, wherein said strong frame has the shape of horizontally disposed letter C with an open side facing said high rear door when said wheelchair is in said transport position.

6. The apparatus according to claim 5, wherein said horizontal kinematical chain further includes a second, a third and a fourth four-member articulate mechanisms based on three sides of the C-shaped strong frame, the second articulate mechanism including said third member from said first four-member articulated mechanism and the fourth articulate mechanism including said intermediate assembly such that rotation of said third member by a predetermined angle relative to said strong frame results in rotation of said intermediate assembly by approximately the same predetermined angle relative to said strong frame.

7. The apparatus according to claim 6, wherein lengths of the members in said second, third and fourth four-member articulate mechanisms are selected so that rotation of said third member by a predetermined angle relative to said strong frame results in rotation of said intermediate assembly by a lesser angle relative to said strong frame, such that after rotation of said strong frame by half-circle, said plane of the wheelchair's wheels is positioned converging with said longitudinal axis of the car towards said front door.

8. The apparatus according to claim 7, wherein said second and third four-member articulate mechanisms are parallelograms.

9. The apparatus according to claim 3, wherein said horizontal drive is a linear acting gear or a hydraulic cylinder pivotally joined to said strong frame and, via some of said plurality of members, to said base unit.

10. The apparatus according to claim 1, wherein said VMM has a vertical drive and is adapted to transport said wheelchair along said lateral side of the car, from said position outside of the luggage compartment to said extended position, by means of said vertical drive.

11. The apparatus according to claim 10, wherein said VMM comprises a first four-member articulate mechanism including as members a base bracket firmly fixed to said intermediate assembly, a first arm pivotally joined to said base bracket by a first end thereof, a second arm pivotally joined by an axle to a second end of said first arm and a first rod joined to an upper end of said second arm and to said base bracket, said second arm having a lower end with a capturing unit bracket joined thereto for carrying said capturing unit, said vertical drive being adapted to rotate said first arm relative to said base bracket, such that rotation of said first arm in one direction provides for simultaneous rotation of said second arm in the other direction, whereby said capturing unit can be simultaneously moved away from said base bracket and lowered towards the earth.

12. The apparatus according to claim 11, wherein said vertical drive is a linear acting gear or hydraulic cylinder joined to said base bracket and to said first arm.

13. The apparatus according to claim 11, further comprising a triangular lever pivotally joined to said axle, a second rod joined to said triangular lever and to said base bracket, parallel to said first arm to form a first parallelogram, and a third rod joined to said triangular lever and to said capturing unit bracket, parallel to said second arm to form a second parallelogram, such that while the two arms rotate, said capturing unit bracket is translated without rotation.

14. The apparatus according to claim 13, wherein said first rod has a freely sliding joint at an end thereof, such that when said capturing unit is lowered by said VMM and the wheels of said wheelchair or wheels of said capturing unit rest on the earth beside said motor car, said sliding joint allows further rotation of said first and second arms and horizontal movement of said capturing unit away from said base bracket.

15. The apparatus according to claim 1, wherein said capturing unit comprises two fork-shaped fixing members adapted to receive two pins mounted on the wheelchair frame, by horizontal rolling of said wheelchair towards the forks.

16. The apparatus according to claim 15, wherein said two fork-shaped members are formed as notched sides of a horizontal C-shaped bracket mounted to said capturing unit bracket.

17. The apparatus according to claim 16, wherein said capturing unit further includes a third fixing member adapted to hold a third point of said wheelchair simultaneously blocking the motion of said wheelchair relative to said fork-shaped members.

18. The apparatus according to claim 17, wherein said third fixing member comprises an arcuate beam with one end rigidly mounted to said C-shaped bracket, a second end adjacent the front of said wheelchair when said two pins are received in said two fork-shaped members, and a lock on said second end adapted to lock on said wheelchair.

19. The apparatus according to claim 18, wherein said lock is a vertical pin adapted to enter an eye associated with the frame of said wheelchair such that said wheelchair may be locked on said vertical pin by slight lifting and lowering the front of the wheelchair.

20. The apparatus according to claim 19, wherein said vertical pin is pivotal about a horizontal axis such that said vertical pin can be flipped out of the way of said wheelchair rolling to or off the fork-shaped members.

21. The apparatus according to claim 1, further having a device for automatic opening and closing of said high rear door, mounted on said base unit.

22. The apparatus according to claim 1, constituting a part of a motor car having a front door adjacent the driver's seat and a luggage compartment with a high rear door; said luggage compartment being of sufficient size to accommondate said wheelchair therein in said transport position; said high rear door being a door having sufficient size to allow, when open, a wheelchair to be removed from the transport position of the motor car to a position outside the luggage compartment, whilst the wheels of the wheelchair remain essentially vertical.

23. A motor car having a front door adjacent the driver's seat and a luggage compartment with a high rear door, and an apparatus adapted to transport automatically a wheelchair from a transport position inside said luggage compartment to an extended position adjacent said front door; said luggage compartment being of sufficient size to accommodate said wheelchair therein in said transport position; said high rear door being a door having sufficient size to allow, when open, a wheelchair to be removed from the transport position of the motor car to a position outside the luggage compartment, whilst the wheels of the wheelchair remain essentially vertical;

said apparatus being entirely accommodated in said luggage compartment when said wheelchair is in said transport position, said apparatus comprising:

a base unit firmly mountable to the floor of said luggage compartment;

a horizontal motion mechanism (HMM) including a strong frame mounted by one end thereof to said base unit for horizontal rotation, and an intermediate assembly rotatably joined to the other end of said frame;

a vertical motion mechanism (VMM) mounted on said intermediate assembly; and a capturing unit mounted on said VMM, for capturing and holding said wheelchair, wherein in said transport position, the plane of the wheelchair's wheels is essentially vertical and perpendicular to the car's longitudinal axis; and said HMM further comprises a horizontal drive and is adapted to perform, driven by said horizontal drive, horizontal rotation of said strong frame and said intermediate assembly, thereby removing the wheelchair from the transport position of the motor car to a position outside the luggage compartment, whilst the wheelchair's wheels remain essentially vertical.

24. A motor car according to claim 23, wherein said HMM further comprises a horizontal kinematical chain including said strong frame and extending between said base unit and said intermediate assembly, wherein said horizontal rotation comprises about a half-circle horizontal rotation of said strong frame from said transport position of the wheelchair in one direction and, simultaneously, about quarter-circle horizontal rotation of said intermediate assembly in the opposite direction, thereby positioning said VMM outside the luggage compartment, with said wheelchair adjacent to a lateral side of said car and said plane of the wheels approximately parallel to said longitudinal axis of the car.

* * * * *